Patented May 30, 1933

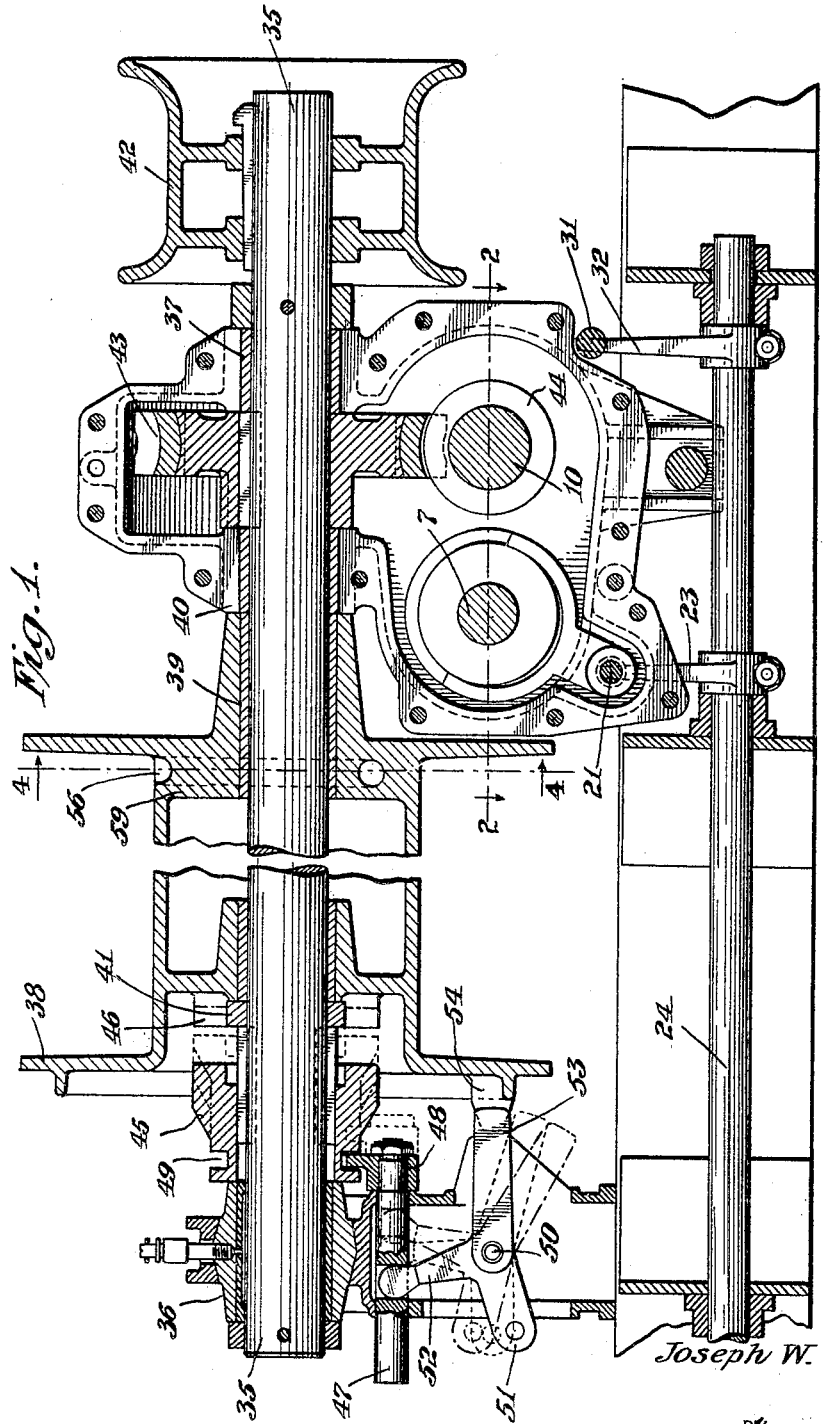

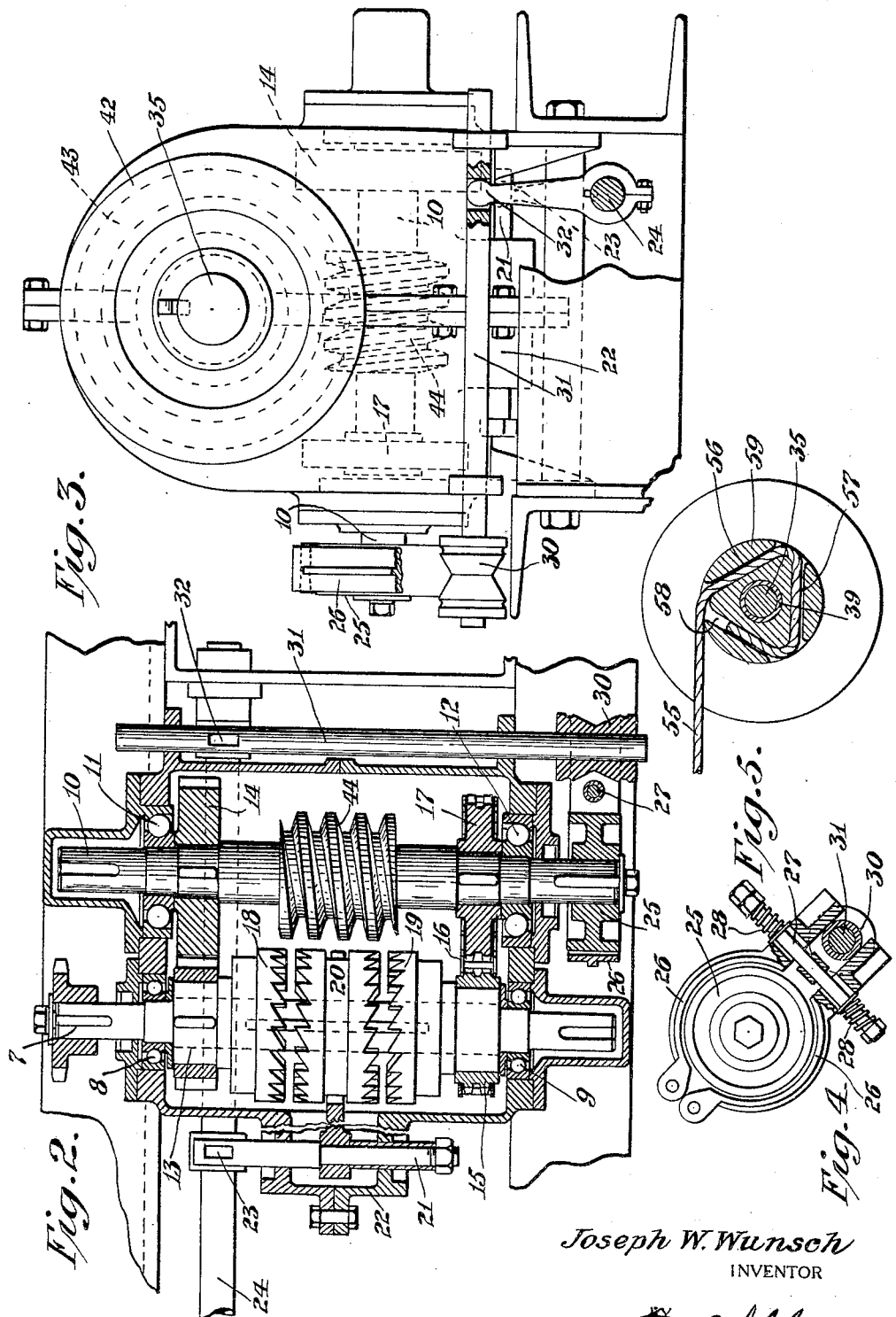

1,912,112

UNITED STATES PATENT OFFICE

JOSEPH W. WUNSCH, OF BROOKLYN, NEW YORK

POWER WINCH

Application filed February 7, 1930. Serial No. 426,552.

My invention relates to what are sometimes called "hoists" in which a drum is used for winding a rope or cable.

One object of my invention is to provide a mechanism in which a single lever may be employed for controlling, hoisting, lowering and stopping.

Another object is to provide a brake which operates automatically as the controlling lever is actuated.

Another object is to provide a construction in which a slow hoisting speed and a fast lowering speed or vice versa can be effected without shifting gears.

Another object is to provide a construction which will prevent dropping a load.

Another object is to provide a simple but effective method of connecting the cable or rope to the drum.

In carrying out the invention I employ a shaft which may be continuously driven in one direction by any source of power either directly or indirectly, and which is provided with clutch members for connecting it directly by gears or through a reversing chain or idler to a counter shaft which can be driven in either direction by the shifting of a control lever. A brake is provided which coacts with the countershaft to automatically stop it as the clutch is shifted for the purpose of stopping or reversing the direction of movement.

This countershaft is connected by a worm and gear with the main shaft of the hoisting drum. A clutch member is mounted on the main shaft so that it always rotates with the shaft but may be shifted longitudinally to engage the end of the drum or to be disconnected therefrom. This clutch member is actuated by a lever which in one position is adapted to act as a stop to prevent the rotation of the drum when the clutch is disengaged from the drum beyond a certain point.

A rope or cable is attached to the drum by the simple expedient of inserting it through holes in the drum which holes are successively disposed at different angles so as to produce sharp bends in the rope and thus develop friction between the rope and the walls of the holes or passages.

Fig. 1 is a longitudinal sectional view of apparatus embodying my invention and showing the drum clutch out and the actuating lever in the position to prevent rotation of the drum.

Fig. 2 is a horizontal sectional view showing the reversing mechanism and brake.

Fig. 3 is an end view of the parts shown in Fig. 1.

Fig. 4 is a detail view of parts of the automatic brake.

Fig. 5 is a detail sectional view showing the anchorage for the rope.

The shaft 7 is supported in suitable bearings 8 and 9 and driven in any suitable manner by any suitable power such as electric, steam or gas and either directly or indirectly through a reduction unit.

A counter shaft 10 is also suitably supported in bearings such as 11 and 12.

A spur gear 13 is freely rotatable on the shaft 7 and meshes with a gear 14 keyed on shaft 10. A sprocket 15 freely rotatable on shaft 7 is connected by chain 16 with a sprocket 17 keyed on shaft 10. A clutch member 18 is connected to and rotatable with the gear 13 and a clutch member 19 is connected to and rotatable with the sprocket 15. Between the clutch member 18 and 19 is mounted a clutch member 20 which is keyed to the shaft 7 but adapted to slide back and forth between clutch members 18 and 19. These clutch members may be of any suitable type such as cone or plate friction discs or toothed as in the form shown. The shifting of the clutch member 20 is accomplished by a bar 21 which slides in the casing 22 and is connected at one end to the arm 23 extending upwardly from the shaft 24. When the shaft 24 is rocked the arm 23 oscillates and moves the shifter rod 21 back and forth so as to shift the intermediate clutch member 20 and thus connect it to one or the other of the clutch members 18 or 19 or leave it in an intermediate neutral position. When the clutch member 20 engages member 18 the shafts 7 and 10 are connected through the medium of the gears 13 and 14 so that they rotate in opposite directions.

When the clutch member 20 engages clutch member 19 the two shafts will rotate in the same direction because of the connecting chain 16 on the sprockets 15 and 17.

On the end of the shaft 10 is a brake drum 25. Pivoted arms 26 are connected by a rod 27 carrying adjustable springs 28 so that normally the springs tend to hold the brake arms or shoes 26 against the brake drum 25 and thus hold the shaft 10 stationary. The cam 30 is carried on the shaft 31 between the ends of the brake shoe arms 26 so that when the shaft 31 is moved longitudinally in either direction the brake shoes are extended and released. The sliding movement of the shaft 31 is effected by an arm 32 which extends upwardly from the shaft 24 above referred to so that when the clutch member 20 is in the neutral position shown in Fig. 2 the cam 30 is in the central position and the brake shoes engage the drum 25 and thus hold the shaft 10 stationary. The main drum shaft 35 is suitably supported in the framework for instance in bearings 36 and 37. The drum 38 is mounted on a sleeve 39 in which the shaft 35 rotates. The drum is positioned longitudinally of the shaft between the bearing 40 and the shoulder 41. I may also provide a supplemental drum or pulley 42 on the outer end of the shaft 35. A worm gear 43 is keyed to the shaft 35 and meshes with a worm 44 on the counter shaft 10 so that the shaft 35 is driven whenever the counter shaft 10 is driven and stops rotating whenever the counter shaft stops rotating.

A clutch member 45 is mounted to slide on a key on the shaft 35 and adapted to engage a clutch member 46 which is secured to or forms a part of the end of the drum 38. This sliding jaw or clutch member 45 is adapted to be operated by a shifting rod 47 and a yoke 48 which engages in the groove 49. A rocker supported on the shaft 50 has an arm 51 by which it is actuated. The arm 52 engages in a slot in the shifter rod 47 so that as the arm 51 is oscillated it moves the rod 47 back and forth and shifts the clutch 45 into and out of engagement with the clutch 46 on the end of the drum. This rocker also has an arm 53 adapted to stand in the path of movement of a lug or projection 54 on the end of the drum 38 so as to prevent rotation of the drum when the clutch 45 is fully retracted as shown in Fig. 1. As the clutch member 45 is moved from the stop position the arm 53 will clear the drum lock 54 and permit the drum to rotate. Further movement of the rocker brings the clutch members 45 and 46 into engagement so that the drum 38 and shaft 35 will rotate together.

The connection between the rope 55 and the drum is effected by inserting the end of the rope through passages 56, 57 and 58 in the hub 59 of the drum. These passages are arranged at angles to each other so as to produce a snubbing effect. This provides a simple and convenient method of fastening a rope without passing it outside of the drum or taking up any space on the drum. In such a construction no tools are required either to anchor the rope or to release it from the drum.

The advantages of simplicity and ruggedness of the combination of features herein shown and described will be apparent to those skilled in the art and I wish it understood that changes in detail of construction and arrangement may be made without departing from the spirit or scope of my invention.

I claim:

1. A winch comprising a main shaft, a winding drum on said shaft, a clutch for connecting said shaft and drum, power mechanism including a continuously rotating driving shaft, a counter shaft geared to the drum shaft, a reversing clutch mounted on said driving shaft including two opposite clutch members geared to said counter shaft, a shifting clutch member mounted on said driving shaft between the opposite clutch members, a friction brake for said counter shaft and means for automatically applying the brake when said shifting clutch is disengaged from the adjacent clutch members.

2. A power winch comprising a continuously rotating driving shaft, a counter shaft, a reversing clutch mounted on said driving shaft and including two oppositely disposed clutch members geared to said countershaft, a shifting clutch member slidable on said driving shaft between said oppositely disposed clutch members, a friction brake for retarding said countershaft, a clutch operating member, means connected to said clutch operating member for automatically applying the brake to the countershaft when said shifting clutch member is disengaged from the other clutch members, and a drum driven from said countershaft.

3. A hoist comprising, a main shaft having a worm gear, a countershaft at an angle to the main shaft, a worm on said countershaft always meshing with said worm gear, a continuously rotating driving shaft, two gears rotatable freely on said driving shaft, a direct gear connection between one of said freely rotatable gears and said countershaft, a separate gear connection between the other freely rotatable gear and said countershaft, and a clutch member mounted to slide upon said driving shaft between said freely rotatable gears, said freely rotatable gears having clutch teeth coacting with said clutch member, a brake for stopping the rotation of the countershaft and a single shifting device for applying the brake to stop the rotation of the countershaft and also the main shaft when the clutch member is being shifted from one gear to the other.

4. A power winch comprising a main shaft having a worm gear, a winding drum on said shaft, a clutch for connecting said shaft and drum, power mechanism including a continuously rotating driving shaft, a counter shaft having a worm geared to the gear on the main shaft, a clutch for connecting said driving shaft to said counter shaft and including a clutch member geared to said counter shaft, and a sliding clutch member mounted on said driving shaft to be engaged with or disengaged from said clutch member, a friction brake for said counter shaft and means for automatically applying the brake when said sliding clutch member is disengaged from the adjacent clutch member.

5. A power winch comprising a main shaft having a worm gear, a winding drum on said shaft, power mechanism including a continuously rotating driving shaft, a counter shaft having a worm geared to the gear on the main shaft, a clutch for connecting said driving shaft to said counter shaft and including two clutch members geared to said counter shaft, a sliding clutch member mounted on said driving shaft to be engaged selectively with either of the other clutch members, a brake for said counter shaft and means for automatically applying the brake when said sliding clutch member is disengaged from the other clutch members.

6. A power winch comprising a main shaft having a worm gear, a winding drum on said shaft, power mechanism including a continuously rotating driving shaft, a counter shaft having a worm meshing with the gear on the drum shaft, a clutch mounted on said driving shaft including two opposite clutch members each geared to said counter shaft, a shifting clutch member mounted on said driving shaft between the opposite clutch members, a brake for one of the shafts other than the driving shaft, and means for automatically applying the brake when said shifting clutch is disengaged from the adjacent clutch members.

7. Hoisting mechanism comprising a main drum shaft having a worm gear, a countershaft arranged transversely to the drum shaft and having a worm meshing with said worm gear, a brake drum on the countershaft, a brake actuator parallel with the countershaft, a continuously running driving shaft parallel to the countershaft and having a sliding clutch keyed to the driving shaft, clutch members rotatably mounted on said driving shaft and geared to said countershaft, a rock shaft parallel with the main shaft and having rock arms connected to the sliding clutch and to the brake actuator respectively.

JOSEPH W. WUNSCH.